United States Patent
Kochar et al.

(10) Patent No.: US 12,158,927 B2
(45) Date of Patent: Dec. 3, 2024

(54) METHOD AND SYSTEM FOR ELECTRONIC CONTENT DELIVERY TO A USER DEVICE THROUGH A WIRELESS CAPTIVE AUDIENCE DEVICE

(71) Applicant: Baker & Taylor, LLC, Charlotte, NC (US)

(72) Inventors: Amandeep Singh Kochar, Charlotte, NC (US); Robert James Bogan, Waxhaw, NC (US); Michael Boyd Ervin, Charlotte, NC (US); Jason Cory Mei, Plano, TX (US)

(73) Assignee: Baker & Taylor, LLC, Charlotte, NC (US)

( * ) Notice: Subject to any disclaimer, the term of this patent is extended or adjusted under 35 U.S.C. 154(b) by 345 days.

(21) Appl. No.: 17/285,864

(22) PCT Filed: Oct. 16, 2019

(86) PCT No.: PCT/US2019/056590
§ 371 (c)(1),
(2) Date: Apr. 15, 2021

(87) PCT Pub. No.: WO2020/081722
PCT Pub. Date: Apr. 23, 2020

(65) Prior Publication Data
US 2021/0349968 A1 Nov. 11, 2021

Related U.S. Application Data

(60) Provisional application No. 62/746,425, filed on Oct. 16, 2018.

(51) Int. Cl.
*G06F 21/10* (2013.01)
*H04L 9/06* (2006.01)
*H04L 9/08* (2006.01)

(52) U.S. Cl.
CPC ............ *G06F 21/10* (2013.01); *H04L 9/0643* (2013.01); *H04L 9/088* (2013.01); *G06Q 2220/18* (2013.01)

(58) Field of Classification Search
CPC ........ G06F 21/10; G06F 21/105; G06F 21/12; G06F 21/121; G06F 21/123;
(Continued)

(56) References Cited

U.S. PATENT DOCUMENTS 6,920,567 B1 7/2005 Doherty et al.
2002/0002541 A1* 1/2002 Williams ............ H04L 63/0428
705/51
(Continued)

FOREIGN PATENT DOCUMENTS

WO 03052632 A2 6/2003
WO 2015112506 A1 7/2015

OTHER PUBLICATIONS

Authorized Officer: Shane Thomas, International Search Report and the Written Opinion, International Patent Application PCT/US2019/056590, Completed Dec. 17, 2019, 9 pp.
(Continued)

*Primary Examiner* — Malcolm Cribbs
(74) *Attorney, Agent, or Firm* — Offit Kurman; Joseph Mathew (57) ABSTRACT

Digital content distribution methods, systems and devices are provided. The digital content distribution utilizes a content distribution server for providing a user device access to digital content. In certain embodiments, the content distribution server: (a) receives a check-out request from a user device via a content access device; (b) provides metainfo to the user device via the content access device; (c) receives an open content command comprising an identifier of the digital content and an identifier for a user from the
(Continued)

user device; (d) determines from the open content command whether the user device is authorized to view the digital content; and (e) provides a license response to the user device based on the user device being authorized to view the digital content, the license response comprising a license and the digital content.

16 Claims, 5 Drawing Sheets

(58) Field of Classification Search
CPC .... G06F 21/128; G06F 21/62; G06F 21/6209; G06F 21/6218; H04L 9/0643; H04L 9/088; H04L 63/10; H04L 63/101; H04L 63/102; G06Q 2220/18
See application file for complete search history.

(56) References Cited

U.S. PATENT DOCUMENTS

| | | | |
|---|---|---|---|
| 2006/0062426 A1* | 3/2006 | Levy | H04N 21/8358 348/E7.071 |
| 2007/0204078 A1 | 8/2007 | Boccon-Gibod et al. | |
| 2008/0065552 A1* | 3/2008 | Elazar | G06F 21/10 705/59 |
| 2010/0077212 A1* | 3/2010 | McReynolds | H04L 9/3271 380/278 |
| 2013/0124868 A1* | 5/2013 | Sorotokin | H04L 63/10 713/176 |
| 2014/0310519 A1* | 10/2014 | Yoo | H04L 63/104 713/165 |
| 2014/0351096 A1* | 11/2014 | Radziwon | G06Q 30/0645 705/26.81 |
| 2015/0026456 A1 | 1/2015 | Kim et al. | |
| 2015/0067887 A1 | 3/2015 | Wang et al. | |

OTHER PUBLICATIONS

Authorized Officer: Athina Nickitas-Etienne, International Preliminary Report on Patentability, International Patent Application PCT/US2019/056590, Issued Apr. 14, 2021, 8 pp.

* cited by examiner

METHOD AND SYSTEM FOR ELECTRONIC CONTENT DELIVERY TO A USER DEVICE THROUGH A WIRELESS CAPTIVE AUDIENCE DEVICE

CROSS-REFERENCE TO RELATED APPLICATIONS

This patent application is the U.S. national stage of International Application No. PCT/US2019/056590, filed Oct. 16, 2019, which claims the benefit of U.S. Provisional Application No. 62/746,425, filed Oct. 16, 2018, the disclosures of which are incorporated herein by reference in their entireties for all purposes.

BACKGROUND

Libraries provide access to a collection of informational sources. The access provided by libraries can be to the public at large or to a select community based on memberships and associations with the library. Libraries can provide access to physical and digital collection of informational sources. A collection includes books, periodicals, newspapers, manuscripts, films, maps, e-books, audiobooks, databases, and so on. As the technology landscape changes, various methods of providing access to digital collection of informational sources becomes inefficient.

SUMMARY

Embodiments of the disclosure provide methods and systems for providing a user device access to digital content. In an embodiment, a method, performed by a content distribution server, for providing a user device access to digital content is provided. The method including: receiving a check-out request from the user device via a content access device; providing metainfo to the user device via the content access device; receiving an open content command comprising an identifier of the digital content and an identifier for a user from the user device; determining from the open content command whether the user device is authorized to view the digital content; and providing a license response to the user device based on the user device being authorized to view the digital content, the license response comprising a license for viewing the digital content and the digital content.

In another embodiment, a content distribution system for providing a user device access to digital content is provided. The system includes: a content access device configured for wireless communication with the user device; and a content distribution server. The content distribution server is configured for: receiving a check-out request from the user device via the content access device; providing metainfo to the user device via the content access device; receiving an open content command comprising an identifier of the digital content and an identifier for a user from the user device; determining from the open content command whether the user device is authorized to view the digital content; and providing a license response to the user device based on the user device being authorized to view the digital content, the license response comprising a license for viewing the digital content and the digital content.

In yet another embodiment, a method, performed by a user device, for gaining access to digital content is provided. The method including: sending a check-out request from the user device to a content distribution server via a content access device; receiving metainfo from the content distribution server via the content access device; sending an open content command comprising an identifier of the digital content and an identifier for the user device to the content access device; receiving a license response from the content access device, the license response comprising a license and the digital content; and consuming the digital content using the license, wherein the consuming comprises: comparing a date and time defined by an expiration date timestamp of the license to a current system time of the user device, and based on the current system time being within the date and time defined by the expiration date timestamp, decrypting the digital content using a decryption key of the license.

DETAILED DESCRIPTION

Public and private libraries that provide access to digital content rely on a content managing software that determines how many digital copies of a specific content has been checked out by a member of the library. In this library model, only members are allowed to check out digital content, i.e., only members have access to the digital content. Furthermore, members not only have to have a physical membership, but they also have to be digitally credentialed by their library to be able to access the digital content. For example, a member should have a username and password to be able to log on to the library's servers for viewing digital content available on its repositories.

There are several drawbacks with how libraries provide access to digital content. By requiring members to be digitally credentialed, libraries have to maintain and manage digital credentials. Managing digital credentials can incur costs, e.g., costs associated with providing adequate security so that membership information is not exposed to online threats relating to hacking. Along the lines of providing adequate security, libraries will have to send members reminder messages or force members to update passwords when internal security protocols change. For example, when a minimum password length or when specific character types should be included in a password, libraries will be forced to contact members and request that that they update or change their passwords in order to comply with changes in security protocol. The effort spent by the library trying to achieve compliance with security provisions can be useless if a member does not comply, thus posing a security risk to a library's digital resources if a hacker were to gain access to the member's account.

Even with the drawbacks, libraries rely on credentialed memberships because the memberships allow libraries to track how many copies of digital content are being checked out. Libraries provide access to both copyright and copyright-free materials. With respect to copyrighted material, the library cannot just post the material on a website without tracking how many digital copies of the material they have disseminated because a number of digital copies of a content that can be disseminated by a library should be governed by license agreements that the library has entered into. As such, libraries track how many copies of each digital content are made available to its membership at a time in order to not violate license agreements.

Embodiments of the disclosure provide a system for allowing libraries to provide digital content to users. In certain embodiments, users do not have to be a member of the library to gain access to the digital content. Using the system, a library is able to limit a number of titles offered to users. The library is also able to ensure that license agreements are not being violated. The user is able to download content to his/her mobile device for later viewing without having the library violate any license agreements. Furthermore, the library is able to enforce loaning policies by ensuring that users check out copies of digital content for a loan period. Once the loan period has expired, then the user no longer has access to the digital content. As such, embodiments of the disclosure implement digital rights management (DRM) schemes to restrict access and usage.

As an aside, embodiments of the disclosure described herein are discussed in terms of a library hosting and providing digital content for its users to access via a user device. However, the disclosure described herein is not intended to be limited to a library. As such, any content provider may be able to utilize the disclosure herein in order to provide digital content to its users/subscribers. Further, the disclosure is not limited to electronic books (e-books). Rather, any type of digital content is contemplated, such as music, video and any other media or multimedia.

Figure 1:
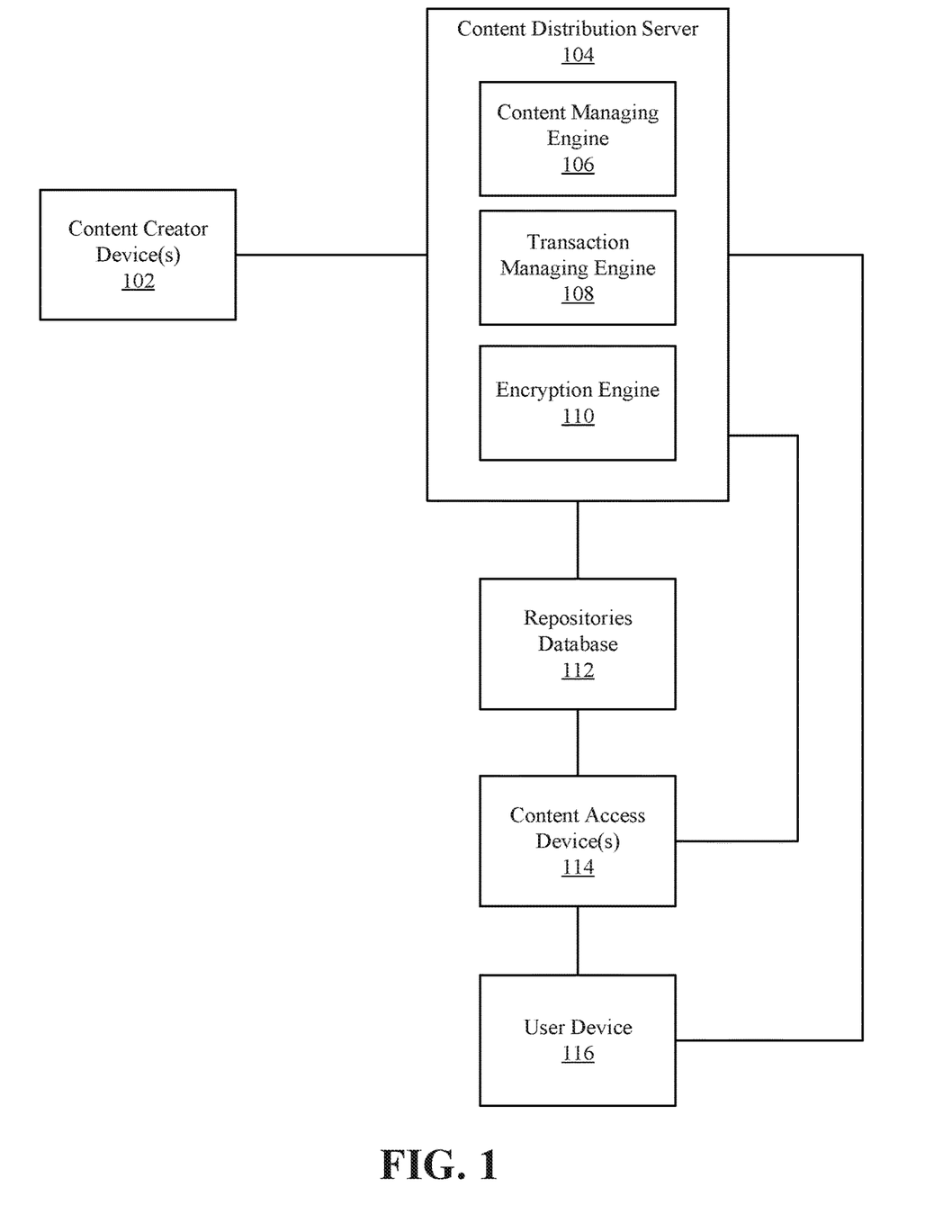
FIG. 1 illustrates a system for providing access to digital content according to an embodiment of the disclosure.

FIG. 1 illustrates a system for providing access to digital content according to an embodiment of the disclosure. The system includes one or more content creator devices 102, a content distribution server 104, one or more repositories databases 112, one or more content access devices 114, and one or more user devices 116. For ease of description, "one or more" will be omitted, but it is understood that more than one of these devices can be present in the system even though the singular form of the noun is used.

From an overview, the content creator device 102 provides digital content to the content distribution server 104. The content distribution server 104 packages and encrypts the content and alerts the repositories database 112 that the content is available. The repositories database 112 holds a list of titles of digital content available to the public. The content access device 114 interfaces with the repositories database 112 to provide the user device 116 access to the list of titles.

The content creator device 102 is a computing device or server of content creators. Content creators include publishers, e-book aggregators, authors, and so on. For example, an author and/or publisher of an e-book is a content creator and holds copyright for the e-book. Examples of the content creator device 102 include desktop computers, laptop computers, mobile devices, computer servers, and other such devices.

The content distribution server 104 is a computing server that packages content provided by the content creator device 102 for dissemination to the public. The content distribution server 104 can transform the provided content into different formats to cater to different operating systems and software utilized by users of the service. The content distribution server 104 includes several engines for providing this service. An engine is a hardware-software combination that implements specific functionality. The content distribution server 104 includes a content managing engine 106, a transaction managing engine 108, and an encryption engine 110.

The content managing engine 106 determines what content is available for lending, determines loan periods of digital content, determines whether a checked out content can be renewed, and allows libraries to manage their digital content collection. The transaction managing engine 108 collects information about digital content check-in and check-out transactions performed by a user. The transaction managing engine 108 determines what rights a user has with respect to the digital content. For example, in the case of an e-book, does the user have access to open the e-book, select and copy text and/or diagrams from the e-book, print the e-book, and so on. The transaction managing engine 108 also tracks digital license information for a respective user, tracks annotations that the user has made to the digital content, and manages encryption keys for encrypted content. In an embodiment where the digital content is an e-book, the transaction managing engine 108 maintains a user's bookmarks, notes, highlights, and last reading position so that the user can continue reading their e-book from the last stopping position on any mobile device. The transaction managing engine 108 also maintains a list of devices that a user has opened a title on to ensure that an e-book is not being read on more devices than allowed by the publisher. The encryption engine 110 encrypts the digital content so that only devices with appropriate encryption keys can consume the digital content.

The repositories database 112 is a database that periodically receives a list of titles of digital content from the content distribution server 104. The repositories database 112 also receives availability of the titles from the content distribution server 104. For example, an e-book may be offered by a library for public consumption, but the e-book may be currently unavailable due to exceeding a number of licensed copies owned by the library. Thus, the title is provided in the list of titles offered by the library but will be marked as not available. The repositories database 112 removes obsolete digital content from the list of titles.

The content access device 114 is a computing device that allows the user device 116 access to titles served on the repositories database 112. The content access device can also be called a captive audience device. The content access device 114 can be a wireless access point that the user device 116 can connect. The content access device 114 includes decryption software for decrypting license information provided by the user device 116. The content access device 114 can store digital content offered for public consumption. Examples of content access device 114 include a wireless router, such as a Wi-Fi router. In certain embodiments, the content access device 114 in the form of a wireless router may have an associated network access storage (NAS) for storing the digital content available over the content access device 114.

The user device 116 is a computing device that allows a user to consume digital content. The user device 116 can be a smartphone, an e-book reader, a laptop computer, a desktop computer, and so on. The user device 116 is equipped with software that allows viewing and downloading of digital content. The software can be e.g., a mobile application and/or a web browser.

Figure 2:
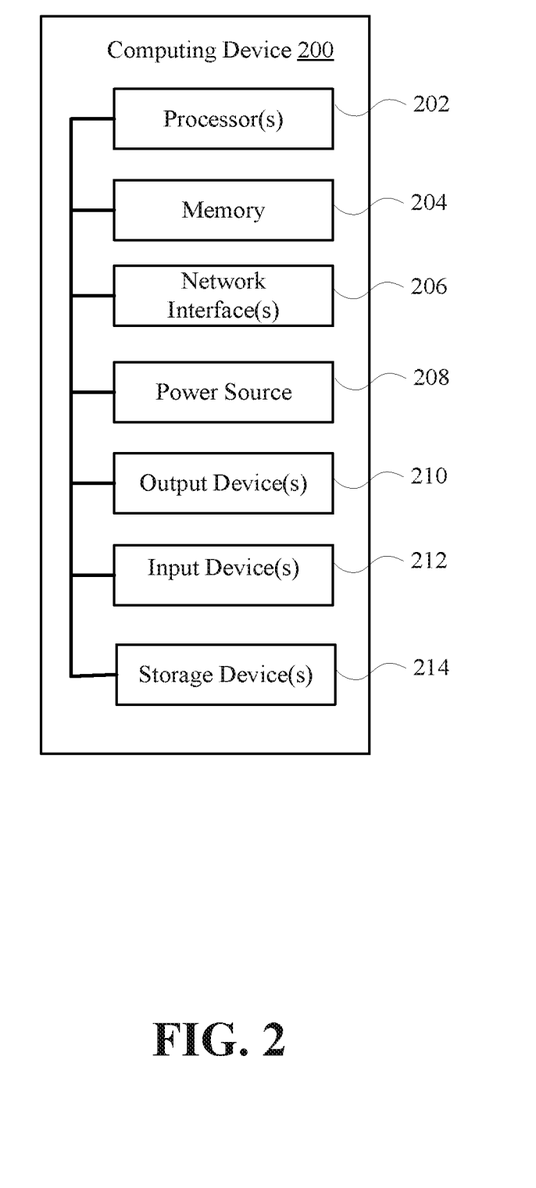
FIG. 2 illustrates components of a computing device according to some example embodiments.

FIG. 2 is a block diagram illustrating basic hardware components of a computing device 200, according to some example embodiments. The content creator device 102, the content distribution server 104, the repositories database 112, the content access device 114, and the user device 116 can be implemented with hardware such as the computing device 200. The computing device 200 may include one or more processors 202, memory 204, network interfaces 206, power source 208, output devices 210, input devices 212, and storage devices 214. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or instructions stored on a storage device 214. Memory 204, which may be a non-transient, computer-readable storage medium, is configured to store information within the device 200 during operation. In some embodiments, memory 204 includes volatile memories such as RAM, dynamic random access memories (DRAM), and static random access memories (SRAM). Memory 204 also maintains program instructions for execution by the processor 202.

Storage device 214 includes one or more non-transient computer-readable storage media configured for long-term storage of information. In some embodiments, the storage device 214 includes floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, radio frequency transceivers, or any other type of device that can send and receive information. Examples of network interfaces 206 include radios compatible with several Wi-Fi standards, 3G, 4G, Long-Term Evolution (LTE), Bluetooth®, etc.

Power source 208 provides power to the computing device 200. Examples include rechargeable or non-rechargeable batteries. Power source 208 may also include a regulator for regulating power from the power grid in the case of a device plugged into a wall outlet.

The computing device 200 may also be equipped with one or more output devices 210. The output device 210 is configured to provide output to a user using tactile, audio, and/or video information. Examples of output device 210 include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 200.

The computing device 200 may also be equipped with one or more input devices 212. Input devices 212 are configured to receive input from a user or the environment where the computing device 200 resides. The input devices 212 may include a presence-sensitive screen or a touch-sensitive screen, a mouse, a keyboard, a video camera, microphone, a voice responsive system, or any other type of input device.

Figure 3:
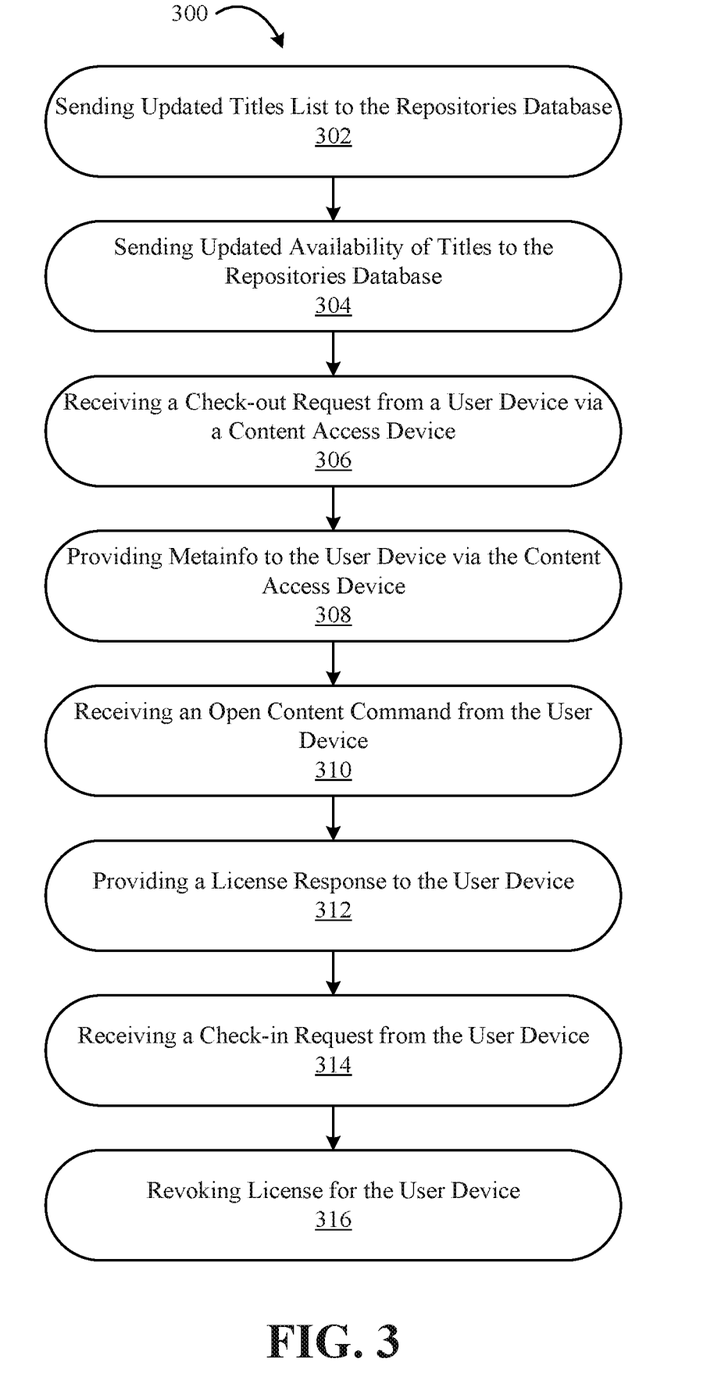
FIG. 3 is a flow diagram for providing a user device access to digital content according to an embodiment of the disclosure.

FIG. 3 is a flow diagram illustrating a process 300 for providing a user device access to digital content according to an embodiment of the disclosure. The process 300 is performed by the content distribution server 104.

Steps 302 and 304 involve maintaining an updated list of titles and availability of the titles on the repositories database 112. At step 302, the content distribution server 104 sends updated titles list to the repositories database 112. As content creators continually provide digital content to the content distribution server 104, the titles are continually updated in a periodic manner. At step 304, based on the relationship between the content distribution server 104 and the repositories database 112, content availability is continually adjusted for DRM purposes.

Steps 306 and 308 involve activities undertaken by the content distribution server 104 when a user checks out digital content. At step 306, the content distribution server 104 receives a check-out request from the user device 116 via the content access device 114. The check-out request includes a message to the content distribution server 104, via an application programming interface (API) of the content access device 114, over a Secure Sockets Layer (SSL) connection. This message tells the content distribution server 104 that the user device 116 has the right to view the digital content until a specific date and/or time.

At step 308, the content distribution server 104 provides metainfo to the user device 116 via the content access device 114. The metainfo includes a unique identifier for the user and a unique identifier for the check-out transaction. Both identifiers for the user and check-out transaction are created by the transaction managing engine 108.

Steps 310 and 312 involve determining whether the digital content should be decrypted for the user. At step 310, the content distribution server 104 receives an open content command from the user device 116. In an embodiment, the open content command is received from the user device 116 via the content access device 114. In another embodiment, the open content command is received directly from the user device 116. The open content command includes the unique identifier for the user, a distinct identifier for the digital content, and a distinct identifier for the library that owns the digital content. In an embodiment, the digital content is downloaded by the user device 116 when the open command is received.

After analyzing the open content command, the content distribution server 104 determines whether the user device 116 has the right to view the digital content. If the user device 116 is authorized to view the digital content, then at step 312, the content distribution server 104 provides a license to the content access device 114. The license is validated by the content access device 114, and a license response is provided to the user device 116. In some embodiments, the license is validated by the content distribution server 104 and provided to the user device 116 directly. If the license response indicates successful validation, then the license is downloaded to the user device 116. If the digital content was not downloaded by the user device 116 at 310, then the digital content is downloaded by the user device 116.

In an embodiment, the license contains decryption keys for decrypting the digital content and is stored in Web Crypto. In an embodiment, the license is signed using base 64 encode Secure Hash Algorithm 1 (SHA1) hash using the canonical form of the license to prevent intentional or unintentional altering of the data contained within the license.

In an embodiment where the digital content is an encrypted e-book, in order for the user device 116 to view the encrypted e-book, the open content request is first validated at the content distribution server 104. Once validated, a Rivest-Shamir-Adleman (RSA)-Optimal Asymmetric Encryption Padding (OAEP) SHA1 key pair is created. Each key pair is unique to the user device 116 based on contents of the open content request. The open content request also includes a license request, so the content distribution server 104 returns a license. The signature of the license is validated by the content access device 114 to ensure that the license has not been altered. Once validated, the encrypted e-book can be rendered on the display of the user device 116.

Steps 314 and 316 involve an early check-in from the user device 116. At step 314, the content distribution server 104 receives a check-in request from the user device 116. The check-in request includes the unique identifier for the check-out transaction. At step 316, the content distribution server 104 revokes the digital content's license granted to the user device 116 at step 312. The content distribution server 104 makes the returned digital content available to other users and updates the transaction corresponding to the initial check-out of the digital content to reflect that the digital content is no longer available to the user device 116. At this point, the user device 116 no longer has access to the digital content because while consuming the digital content, the user device 116 sends confirmation requests to the content distribution server 104 to verify check-out status. That is, the user device 116 periodically checks with the content distribution server 104 to make sure that the license is still valid.

In an embodiment, the digital content is an e-book in ePUB standard, e.g., ePub2 or ePub3 standard. The content distribution server 104 encrypts e-books except those exempted by file formats, e.g., ePub and ePub3 standards. Outside of rending the e-book on the user device 116, the e-book remains in an encrypted state stored in Web Crypto.

Figure 4:
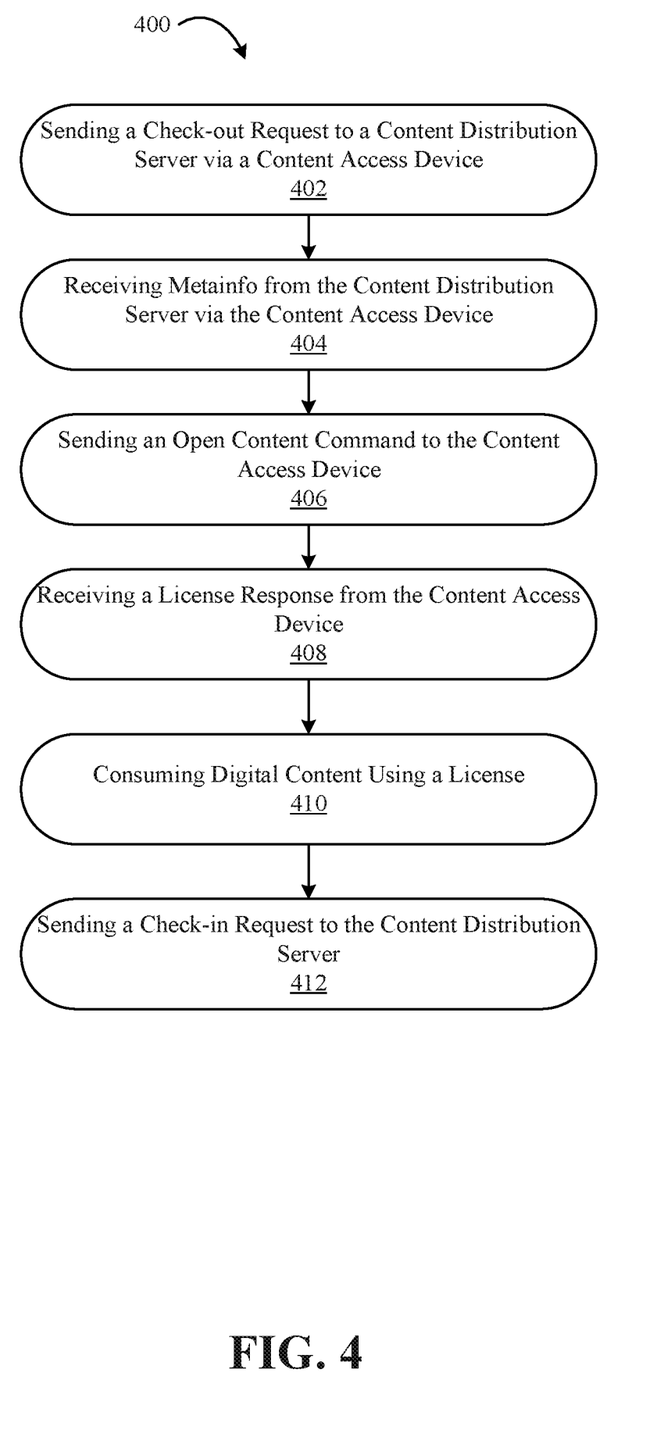
FIG. 4 is a flow diagram for a user device to gain access to digital content according to an embodiment of the disclosure.

FIG. 4 is a flow diagram illustrating a process 400 performed by the user device 116 to gain access to digital content according to an embodiment of the disclosure. At step 402, the user device 116 sends a check-out request to the content distribution server 104 via the content access device 114. The check-out request includes a message to the content distribution server 104, via an application programming interface (API) of the content access device 114, over a Secure Sockets Layer (SSL) connection. This message tells the content distribution server 104 that the user device 116 has the right to view the digital content until a specific date and/or time.

At step 404, the user device 116 receives metainfo from the content distribution server 104 via the content access device 114. The metainfo includes a unique identifier for the user and a unique identifier for the check-out transaction. Both identifiers for the user and check-out transaction are created by the transaction managing engine 108.

At step 406, the user device 116 sends an open content command to the content access device 114. The open content command includes the unique identifier for the user, a distinct identifier for the digital content, and a distinct identifier for the library that owns the digital content. In an embodiment, the digital content is downloaded by the user device 116 when the open command is received.

At step 408, the user device 116 receives a license response from the content access device 114. Also at step 408, the user device 116 receives a license for accessing the digital content and also receives a copy of the digital content.

At step 410, the user device 116 consumes the digital content using the license. In an embodiment, the digital content is an e-book, and when the user device 116 opens the e-book, a current system time of the user device 116 is compared against an expiration date timestamp contained within the license. So, as the user is reading the e-book, the current system time is continually compared against the expiration date timestamp in either a periodic or an irregular manner. For example, the continual comparison may occur when a rendering engine of the user device 116 retrieves files that make up chapters or sections of the e-book. If at the time the current system time is greater than the expiration date timestamp, the user device 116 is denied access to the e-book until a valid, unexpired, or new license is obtained from the content distribution server 104. Furthermore, the user device 116 can periodically retrieve or check for an updated license from the content distribution server 104 to validate that the expiration period has not changed.

Step 412 involves a situation where the license is still valid and has not expired. The user device 116 sends a check-in request to the content distribution server 104. Once the check-in request is sent, the license is revoked. If the user device 116 tries to view the digital content, the user device 116 checks with the content distribution server 104 to verify that the license is still valid. The user device 116 will be unable to view the content because the license is revoked license at the content distribution server 104.

Figure 5:
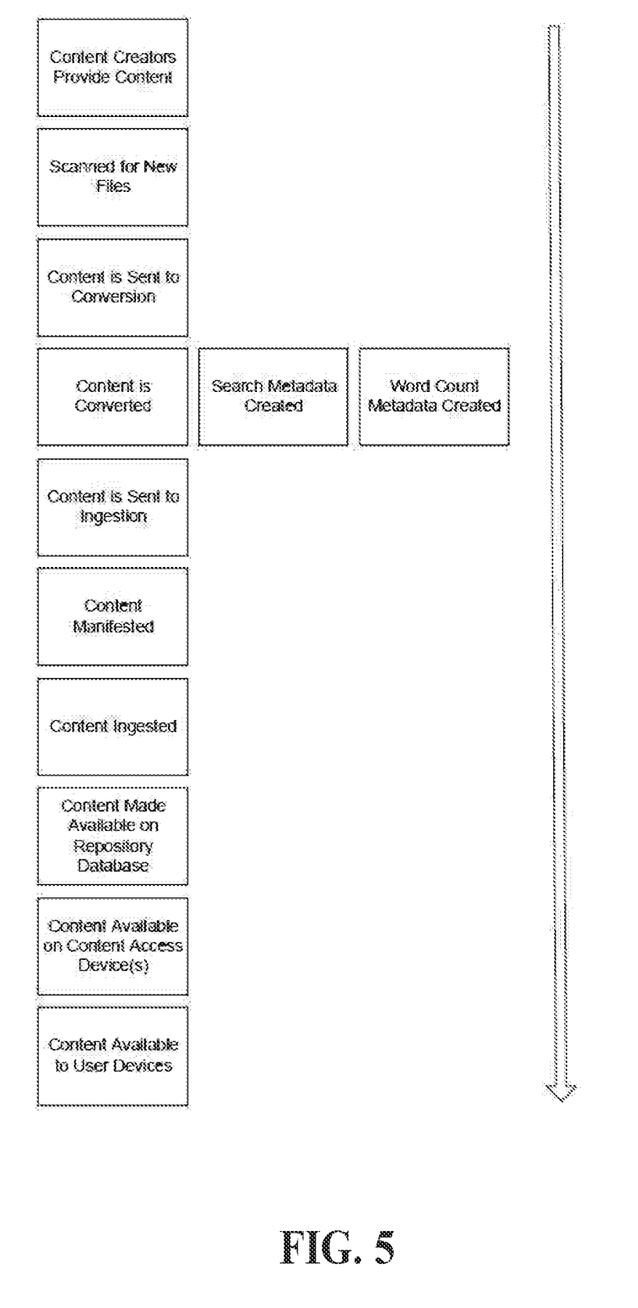
FIG. 5 is a flow diagram for providing digital content according to an embodiment of the disclosure.

FIG. 5 is a flow diagram illustrating a process performed by the content distribution server 104 (see FIG. 1) for preparing digital content for distribution, according to an exemplary embodiment of the disclosure. At the start of the process, the content distribution server 104 receives digital content from the content provider device 102. The content distribution server 104 scans for new files from the content provider device 102 and sends the scanned digital content for conversion into multiple formats. This includes creation of metadata describing the digital content, and in the event that the digital content is an e-book it stores a word count. After conversion, the content distribution server 104 then encrypts the digital content. Subsequently, the content distribution server performs an ingestion process, which populates the digital content within the content access device 114. At this point, a reference to the content is stored in the repository database 112 and made available to user devices 116 via the content access device 114.

In an embodiment, the digital content is an e-book and encrypting the e-book at the content distribution server 104 (see FIG. 1) is accomplished during the conversion and ingestion processes. The packaging process uses Advanced Encryption Standard (AES) 256 bit encryption. The AES Key is derived from a "Content-Key" from the transaction managing engine 108, based upon an identification number of the source. The identification number can be an International Standard Book Number (ISBN) of the e-book. The "Content-Key" is utilized as the password and salt value for an RFC-2898 algorithm in order to generate a consistent AES Key.

In an embodiment, the scanning for the digital content and performing the conversion from FIG. 5 includes a web service call from the content managing engine 106 to the transaction managing engine 108 for obtaining from the transaction managing engine 108 a consistent globally unique identifier (GUID) value for the e-book. The GUID value will be used to seed the RFC-2898 algorithm.

In an embodiment, encryption process involves using the Content-Key's bytes as the password for a RFC-2898 method. A hash value, using SHA1 against the GUID, is used as the salt value for the RFC-2898 method. The RFC-2898 method will produce a consistent AES Key and initialization vector (IV) from the given password and hash value.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, performed by a content distribution server, for providing a user device access to digital content, the method comprising:
   receiving a check-out request from the user device via a content access device;
   providing metainfo to the user device via the content access device, the metainfo including a unique identifier of a check-out transaction associated with the check-out request;
   receiving an open content command comprising an identifier of the digital content, an identifier for a user from the user device, and an identifier of an owner of the digital content;
   determining from the open content command whether the user device is authorized to view the digital content;
   providing a license response to the user device based on the user device being authorized to view the digital content, the license response comprising a license for viewing the digital content and the digital content;
   receiving a check-in request from the user device, the check-in request including the unique identifier of the check-out transaction; and
   revoking the license for viewing the digital content provided to the user device based on receiving the check-in request from the user device.

2. The method according to claim 1, further comprising making the license for viewing the digital content available to other user devices to gain viewing rights to the digital content.

3. The method according to claim 1, wherein the license comprises an expiration date timestamp, the expiration date timestamp defines a period of time after which the license for viewing the digital content expires and the user device no longer has rights to view the digital content.

4. The method according to claim 1, wherein the content access device is a wireless router, and the content distribution server interacts with the user device via a browser of the user device.

5. The method according to claim 4, wherein the wireless router comprises a network access storage (NAS) that stores the digital content.

6. The method according to claim 1, wherein the license comprises encryption keys for decrypting digital content.

7. The method according to claim 6, wherein the digital content was encrypted using a base 64 encode Secure Hash Algorithm 1 (SHA1) hash and the encryption keys from the license allow the user device to decrypt the base 64 SHA1 hash.

8. The method according to claim 7, wherein the digital content is an electronic book (e-book) in an ePUB standard stored in an encrypted state in Web Crypto.

9. A content distribution system for providing a user device access to digital content, the system comprising:
   a content access device configured for wireless communication with the user device; and
   a content distribution server configured for:
      receiving a check-out request from the user device via the content access device;
      providing metainfo to the user device via the content access device, the metainfo including a unique identifier of a check-out transaction associated with the check-out request;
      receiving an open content command comprising an identifier of the digital content, an identifier for a user from the user device, and an identifier of an owner of the digital content;
      determining from the open content command whether the user device is authorized to view the digital content;
      providing a license response to the user device based on the user device being authorized to view the digital content, the license response comprising a license for viewing the digital content and the digital content;
      receiving a check-in request from the user device, the check-in request including the unique identifier of the check-out transaction; and
      revoking the license for viewing the digital content provided to the user device based on receiving the check-in request from the user device.

10. The system according to claim 9, wherein the content distribution system is further configured for making the license for viewing the digital content available to other user devices to gain viewing rights to the digital content.

11. The system according to claim 9, wherein the license comprises an expiration date timestamp, the expiration date timestamp defines a period of time after which the license for viewing the digital content expires and the user device no longer has rights to view the digital content.

12. The system according to claim 9, wherein the content access device is a wireless router, and the content distribution server interacts with the user device via a browser of the user device.

13. The system according to claim 12, wherein the wireless router comprises a network access storage (NAS) that stores the digital content.

14. The system according to claim 9, wherein the license comprises encryption keys for decrypting digital content.

15. The system according to claim 14, wherein the digital content was encrypted using a base 64 encode Secure Hash Algorithm 1 (SHA1) hash and the encryption keys from the license allow the user device to decrypt the base 64 SHA1 hash.

16. The system according to claim 15, wherein the digital content is an electronic book (e-book) in an ePUB standard stored in an encrypted state in Web Crypto.

\* \* \* \* \*